S. W. WIDNEY.
PIANO TRAP MECHANISM.
APPLICATION FILED MAR. 10, 1913.
1,099,413.
Patented June 9, 1914.
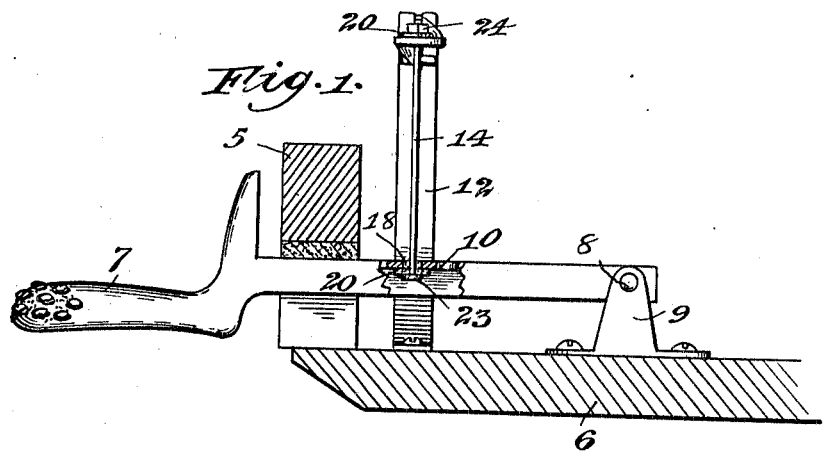
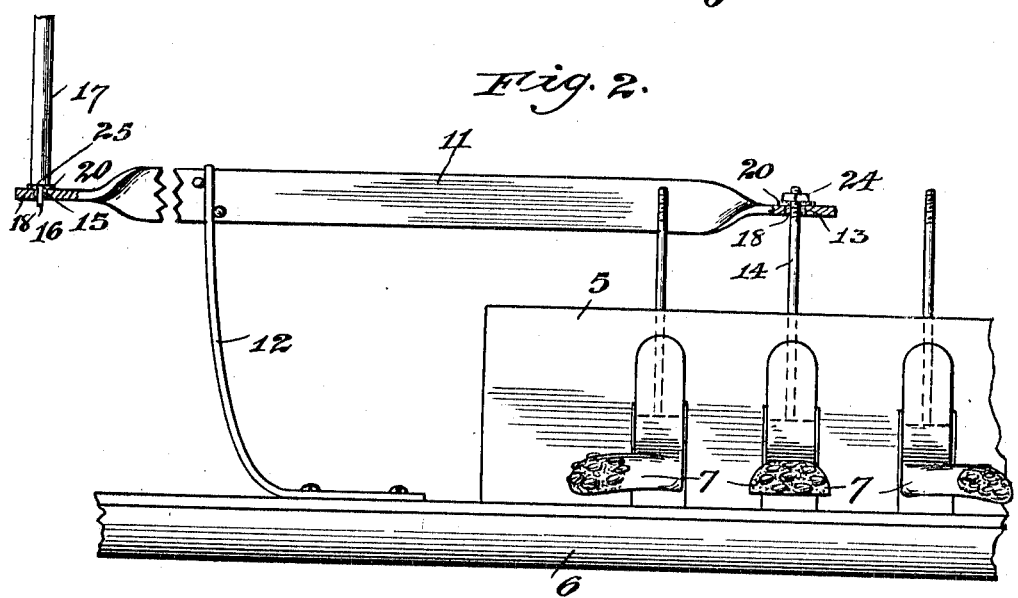
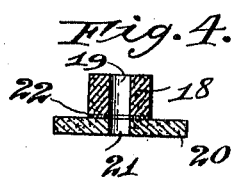
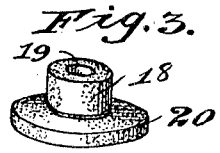
Witnesses,
Inventor,
Stanley W. Widney,
By Offield, Towle, Graves & Offield
Attys.

UNITED STATES PATENT OFFICE.

STANLEY W. WIDNEY, OF CHICAGO, ILLINOIS.

PIANO-TRAP MECHANISM.

1,099,413.

Specification of Letters Patent. Patented June 9, 1914.

Application filed March 10, 1913. Serial No. 753,239.

*To all whom it may concern:*

Be it known that I, STANLEY W. WIDNEY, a citizen of the United States, residing at Chicago, in the county of Cook and State of Illinois, have invented certain new and useful Improvements in Piano-Trap Mechanisms, of which the following is a specification.

My present invention relates to improvements in piano trap mechanisms, and has reference more particularly to an improved joint between the lever and rod parts of the mechanism.

It has hitherto proved a matter of great difficulty in piano trap mechanisms to avoid squeaking and rattling in the operation of the parts and to provide an absolutely quiet and noiseless mechanism.

The main object of my present invention is to improve these devices in the above noted respect, and produce a mechanism which shall be entirely free from the objectionable squeak and rattle hitherto characteristic, in a greater or less degree, of all such mechanisms with which I am acquainted.

Another object of the invention is to provide a construction of increased simplicity, durability, and economy of cost of production and maintenance.

My invention, its mode of operation, and its advantages will be readily understood when considered in connection with the accompanying drawing, in which—

Figure 1 is a side elevation, in cross-section through the pedal-rail and base-board of the instrument. Fig. 2 is a front elevation. Fig. 3 is a perspective detail of my improved non-metallic bushing. Fig. 4 is a central vertical section through the bushing shown in Fig. 3.

Referring to the drawing, 5 designates the slotted pedal-rail and 6 the base-board of the piano.

7 designates one of the usual pedal levers fulcrumed at its inner end at 8 upon suitable supports 9. The inner portion of the pedal lever 7 is hollow or channel-shaped, and its upper side is provided with a plurality of apertures 10 to provide an adjustable connection therefrom to the main trap lever 11, which latter, as herein shown, is fulcrumed upon a spring support 12 secured to the base-board 6. One end of the trap lever 11 is apertured as shown at 13, and is connected with the pedal-lever 7 by a rod 14. The opposite end of the trap lever 11 is similarly apertured at 15 and receives the lower reduced end portion 16 of the damper or hammer-rail actuating rod 17.

Figs. 3 and 4 show in detail an improved bushing which I employ at any or all of the joints between the connecting rod 14 and the pedal-lever 7, the connecting rod 14 and the trap lever 11, and the trap lever 11 and the lifter rod 17. This bushing is a non-metallic structure, preferably of felt or analogous yielding material, and is formed of a cylindrical portion 18 having a central bore 19 and a head or cap portion 20 having a cylindrical hole 21. The cylindrical body portion 18 and head portion 20 are connected by a cement joint indicated at 22, with the bore 19 and hole 21 in alinement. The bushing thus formed is applied at the three joints indicated, the cylindrical body portion 18 of the bushing snugly fitting the aperture 10 of the pedal-lever and the end apertures 13 and 15 of the trap lever, with the head portion 20 lying against the flat portion of said levers immediately surrounding said apertures. The connecting rod 14 extends through the bushing and is provided with shoulder portions such as the head 23 and nut 24 engaging the outer surface of the head portions 20 of the bushings. The dowel or pintle 16 of the lifter rod 17 at the opposite end of the trap-lever 11 extends through a similar bushing with its shoulder 25 resting upon the cap of the bushing.

The described construction completely prevents any contact of metal with metal at the joints of the trap mechanism, and thus renders the action of the mechanism entirely noiseless. Furthermore, the relatively soft and yieldable character of the bushing accommodates the slight relative lateral movement of the connected parts that occurs in the operation of the mechanism without involving any undue looseness or lost motion. The construction is highly efficient, very simple and economical as regards cost of production and maintenance, and possesses a high degree of durability. By making the bushing in body and head parts cemented together, as described, the bushing can be produced with much greater ease and economy of manufacture than where the parts are made integral.

I claim—

The herein described bushing for piano trap mechanisms comprising a cylindrical body portion of felt or like yielding material, and a head or cap portion of greater diameter and similar material connected by a cement joint to one end of said cylindrical body portion and provided with a central aperture registering with the bore of said cylindrical body portion.

STANLEY W. WIDNEY.

Witnesses:
SAMUEL N. POND,
EDMUND G. INGERSOLL.

Copies of this patent may be obtained for five cents each, by addressing the "Commissioner of Patents, Washington, D. C."